US009189362B2

(12) United States Patent
Bellomie

(10) Patent No.: US 9,189,362 B2
(45) Date of Patent: Nov. 17, 2015

(54) METHOD FOR MEASURING THE PERFORMANCE OF A TARGET SERVER HOUSING A DYNAMIC MONITORING TOOL

(75) Inventor: Sebastien Bouchex Bellomie, Vanves (FR)

(73) Assignee: Infovista SA, Les Ulis (FR)

( * ) Notice: Subject to any disclaimer, the term of this patent is extended or adjusted under 35 U.S.C. 154(b) by 740 days.

(21) Appl. No.: 12/668,947

(22) PCT Filed: Jul. 11, 2008

(86) PCT No.: PCT/FR2008/051325
§ 371 (c)(1),
(2), (4) Date: Jan. 13, 2010

(87) PCT Pub. No.: WO2009/013429
PCT Pub. Date: Jan. 29, 2009

(65) Prior Publication Data
US 2010/0205294 A1   Aug. 12, 2010

(30) Foreign Application Priority Data
Jul. 13, 2007   (FR) ...................................... 07 56501

(51) Int. Cl.
*G06F 15/173* (2006.01)
*G06F 15/177* (2006.01)
*G06F 11/34* (2006.01)

(52) U.S. Cl.
CPC ........ *G06F 11/3466* (2013.01); *G06F 11/3414* (2013.01); *G06F 11/3419* (2013.01); *G06F 11/3476* (2013.01)

(58) Field of Classification Search
CPC ......................... G06F 11/3414; G06F 11/3466
USPC .................................... 709/224, 223; 715/736
See application file for complete search history.

(56) References Cited

U.S. PATENT DOCUMENTS

2003/0145079 A1*   7/2003   Breese et al. ................. 709/224
2007/0106769 A1*   5/2007   Liu ............................... 709/223
2007/0234365 A1*   10/2007  Savit ............................. 718/104

FOREIGN PATENT DOCUMENTS

WO   WO 00/14617        3/2000
WO   WO 00/75814 A1    12/2000

* cited by examiner

*Primary Examiner* — David Lazaro
*Assistant Examiner* — Xiang Yu
(74) *Attorney, Agent, or Firm* — Greer, Burns & Crain, Ltd.

(57) ABSTRACT

A method for measuring the performance of at least one target server housing a dynamic monitoring tool which can be controlled by scripts, the dynamic monitoring tool having predefined probes for acquiring the data relating to the behavior of an operating system and applications of the target server, the method including, from a remote management server, the following steps: a dynamic monitoring tool within the target server is accessed via a communication network, at least one script to be executed by the dynamic monitoring tool is remotely transmitted, and at predetermined times, the target server is automatically accessed so as to retrieve the performance data resulting from the execution of the script by the dynamic monitoring tool.

5 Claims, 2 Drawing Sheets

Figure 1:
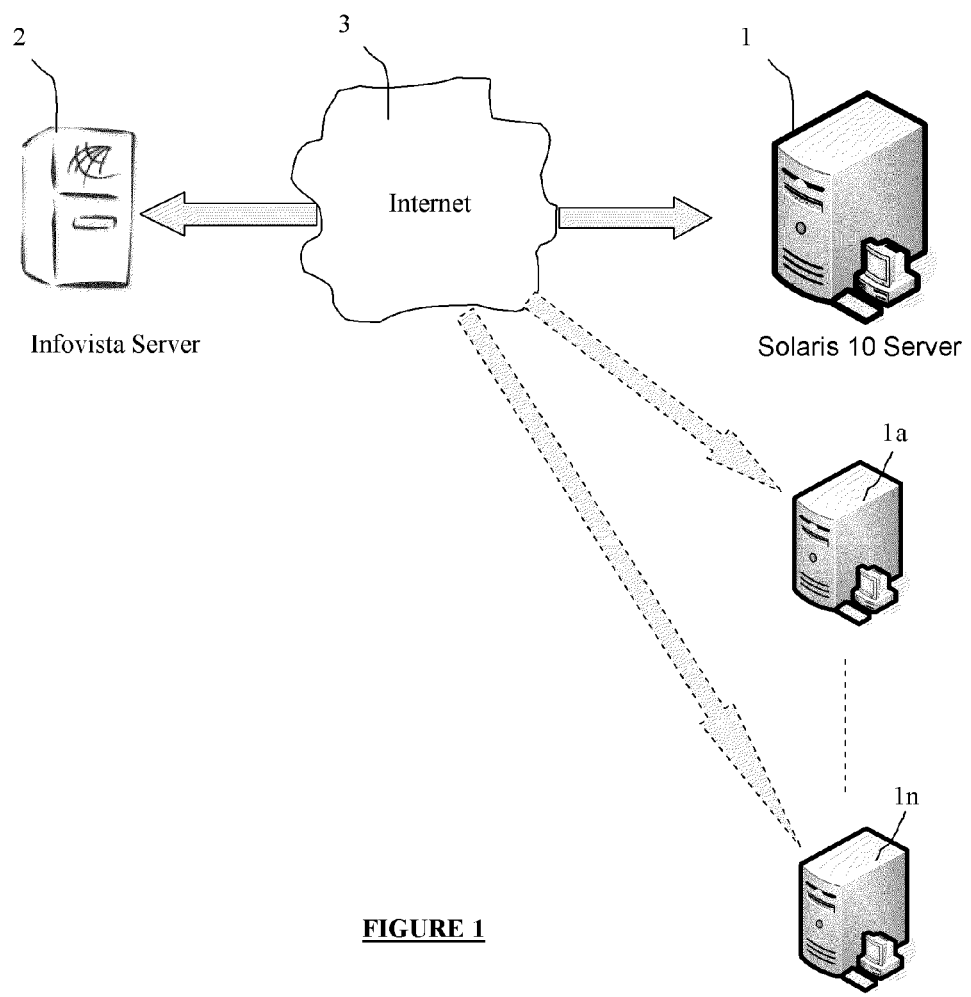

METHOD FOR MEASURING THE PERFORMANCE OF A TARGET SERVER HOUSING A DYNAMIC MONITORING TOOL

The present invention relates to a method for measuring the performance and monitoring the quality of service of an information system. In particular it relates to access to performance data of a remote server.

The increasing complexity of information systems integrating in particular, client-server architectures and integrated local area networks, makes effective management of the quality of service more and more difficult within these systems. On the one hand, the administrators and managers of these information systems are led to adopt a service approach towards users and to operate as service providers concerned about the quality of services provided at the same time as being faced with reductions in operating costs, and on the other hand, the users of these services demand yet higher levels of quality of service.

Control over the quality of service involves a reliable feedback system of relevant information originating from the different resources of the information system. However, it is hard to exploit large-volume performance data repositories residing in the network equipment, in the systems and in the software applications, to consolidate these data, then to reproduce them in the form of dashboards for the purposes of managing capacity or quality of service. It is sought, on the one hand, to manage the quality of service at user level: availability, application response time, reactivity faced with a technical support incident, and on the other hand, to manage the technical quality of service relating to the infrastructure itself: traffic, network transit time, central processing unit usage time, etc.

Moreover, numerous different operating systems exist. In order to be able to manage the greatest number of resources, it is sometimes necessary to produce an application dedicated to each operating system. The purpose of these applications is to allow communication between the resource to be managed (target server) and the remote management server. In this way, for example the application Patrol by BMC Software® is known which needs to be installed, configured and administered in the target server. This constitutes a significant constraint and can introduce risks of incompatibility or at least interference with the operating system of the target server. Such an implementation does not guarantee maximum stability.

The SNMP ("Simple Network Management Protocol") agent is also known which allows remote or local administration over internet-type networks. Unfortunately, this application is not adapted for producing performance measurements and cannot easily be extended without modifying the source code.

The present invention aims to overcome the above drawbacks by proposing a novel method for the feedback of the relevant information from a remote server.

A purpose of the present invention is a method which is simple to implement for retrieving performance data from a given target server.

Another purpose of the invention is to propose a stable method of retrieving data from a target server without interfering with the operating system of this target server.

At least one of the aforementioned objectives is achieved with a method for measuring the performance of at least one target server housing a dynamic monitoring tool which can be controlled by scripts; this dynamic monitoring tool comprising predefined probes for acquiring the data relating to the behaviour of an operating system and applications of said target server, this method comprising, from a remote management server, the following steps:
  the dynamic monitoring tool within the target server is accessed via a communication network,
  at least one script to be executed by the dynamic monitoring tool is remotely transmitted, and
  at predetermined times, the target server is automatically accessed in order to retrieve the performance data resulting from the execution of said script by the dynamic monitoring tool.

The dynamic monitoring tool is also called dynamic tracing tool.

With the method according to the invention the dynamic monitoring tool already present in the target server is advantageously used. Generally, such a dynamic monitoring tool is pre-integrated with the operating system of the target server. It is therefore fully compatible with this operating system. Therefore, it is not necessary to develop and install a new tool for retrieving performance data within the target server. This tool is accessed remotely from a management server. The present invention is therefore remarkable for its simplicity of implementation. The performance data are therefore fetched automatically by the script, and the management server retrieves these performance data regularly in an automatic fashion.

In practice, the scripts are produced within this management server and the performance data retrieved can be used as variables by performance management software within the management server.

The dynamic monitoring tool executes the scripts originating from the management server as with any other script, in particular by fetching data from the target server as a function of the predefined probes. These probes are predetermined measurement points in the target server.

Said data relating to the behaviour of the operating system and the applications which contain the performance data (hardware and software data in particular) intended for return to the management server.

According to an advantageous feature of the invention, the dynamic monitoring tool is the Dtrace module which is a complete dynamic monitoring structure integrated in Solaris™ 10 or higher. This dynamic monitoring tool allows administrators and developers working on running production systems to monitor the behaviour of user programs and the operating system itself. Usually, DTrace is used locally and in a one-off fashion. In order to do this, according to the prior art, the script is entered on a command line using a text editor in real time in order to query a few measurement points, then the result is immediately retrieved after execution of the script.

On the contrary, in the present invention, the script is produced in advance, remotely within a management server, this script is sent once only to the DTrace module which regularly executes and successively stores the results which are regularly retrieved by the management server. In Sun technology for example, DTrace is a common agent container module that will hereinafter be called the cocoa suite.

More precisely, when the DTrace module is used, the script is defined within a consumer which is an envelope which makes it possible to convey the script from the management server to the target server.

In fact, DTrace is a technology developed by SUN for its Solaris™ operating system. The probes are therefore predefined in a very precise manner. As the present invention can use DTrace in order to execute scripts, this provides the present invention with great stability and high precision in the acquisition of performance data. Moreover, DTrace has been designed to operate in the system kernel. It therefore makes low demands on memory and the CPU. The present invention is therefore very economical in terms of memory and CPU usage.

According to an advantageous embodiment of the invention, specific probes are used which allow the acquisition of performance data relating to:
memory usage,
processor activity, and
disk activity, i.e. writing and reading in particular.

Other parameters linked to the system resources or applications can also be acquired by using suitable probes.

These system performance data sometimes constitute what is called KPI, for "Key Performance Indicator".

Preferably, the target server is accessed using a dedicated protocol. In the context of DTrace in a Solaris™ machine, the Cocoa agent of the target server can be accessed using the JMX protocol.

According to an advantageous feature of the invention, parameters relating to the lifetime of said script to be executed are sent at the same time as the script. Advantageously, contrary to the usual one-off use of DTrace in particular, the method according to the invention allocates a given lifetime to each script which can be a few hours or a few years. In fact, usually, a script is executed then destroyed at the end of its one-off execution. With the present invention, the script becomes virtually permanent. In particular, an infinite lifetime parameter can be sent in such a way that the dynamic monitoring tool executes the script continuously.

Preferably, at the remote transmission step, the script is saved in the random access memory of the target server.

Similarly, the results generated by the dynamic monitoring tool can also be saved in the random access memory of the target server and not on the disk of the target server. Thus, when the performance data are retrieved, the management server directly accesses the random access memory without contacting the dynamic monitoring tool.

Advantageously, to improve the flexibility of the method, the transmitted script can be a generic script that is transmitted together with, a specific parameter. In fact, the specific scripts intended to control one application or another can be edited. But preferably the generic scripts can also be edited. One or more parameters can be associated with these generic scripts, for example the name of the application to be monitored. Thus, in order to control several applications, several generic scripts can be sent but each time with one or more different parameters (the name of the target application).

Figure 2:
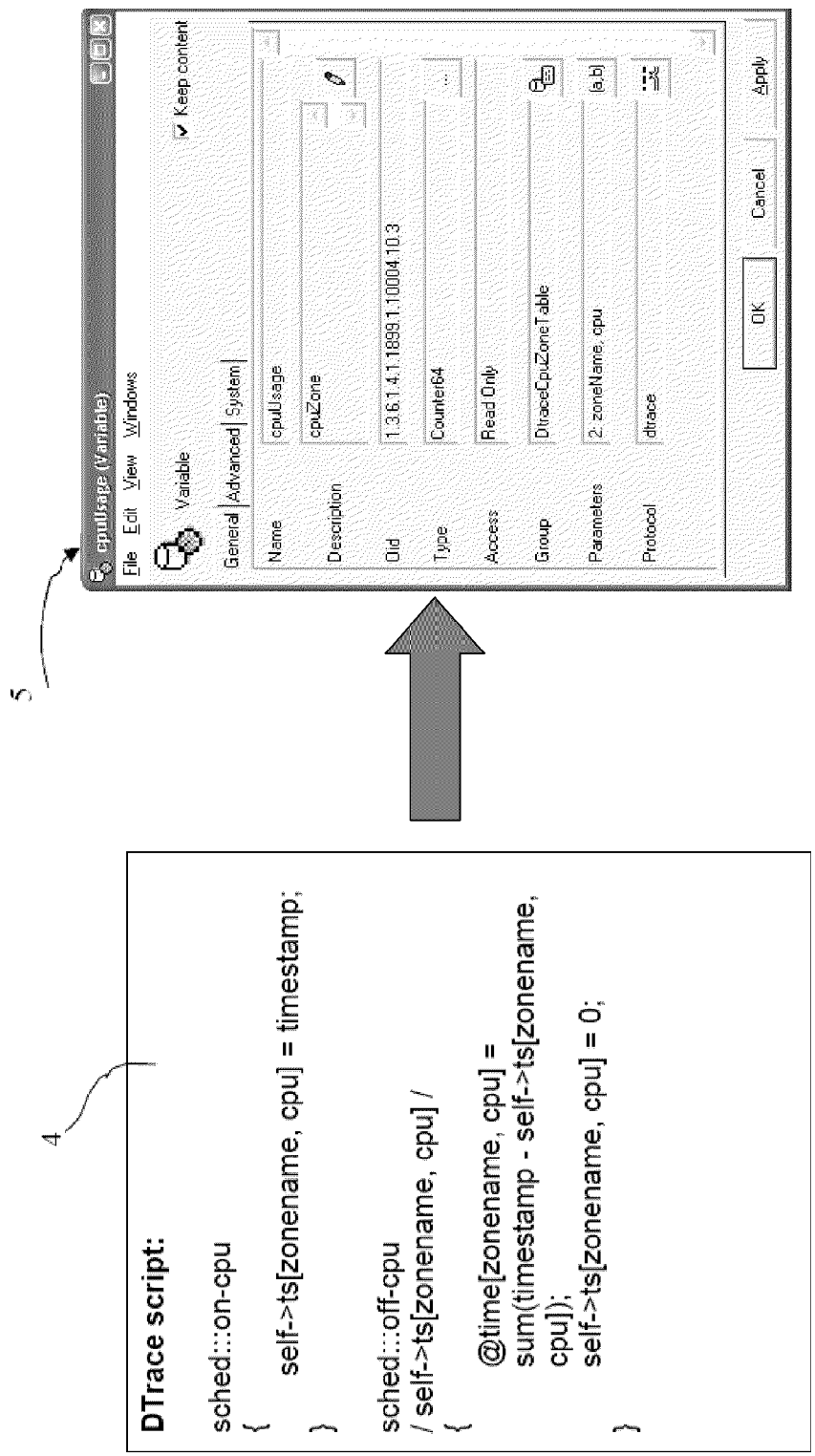

Other advantages and characteristics of the invention will become apparent upon examination of the detailed description of an embodiment which is in no way limitative, and the attached drawings, in which:

FIG. 1 is a general view of a system implementing a method according to the present invention, and FIG. 2 illustrates an example script and its correspondence as a variable for an application for measuring performance and monitoring quality of service within a management server.

Although the invention is not limited by it, the method according to the invention will now be described for the retrieval of performance data within a target server 1 having Solaris™ 10 u4 as operating system with Dtrace as dynamic monitoring tool.

FIG. 1 shows the target server 1, the performance and the quality of which are to be permanently measured. Other target servers 1a-1n can also be controlled. The management server 2 is of Infovista Server® type provided in order to manage the performance and the quality of service of the target servers.

This management server 2 is connected to the target servers via a communication network 3 such as the internet network or a local network.

The method according to the present invention can proceed in the following manner.

A script is produced within the management server 2. This script is sent via the network 3 to the DTrace module of the Cocoa agent contained in the target server 1. The DTrace module receives the script and executes it. This execution depends on the lifetime specified in the sending of the script. This lifetime can be several years. DTrace regularly executes the script and stores the results in a well-defined memory space. Periodically, the management server will retrieve the results stored in this way. These results contain the performance and quality data of the target server. These performance data originate from the predefined probes in the DTrace module but are activated by the script. The following can therefore be measured periodically:
memory usage,
processor activity, and
disk activity.

A first example of the script is given in the annex. This script is for measuring the CPU usage of a system.

Advantageously, in the target server 1, Solaris™ 10 u4 includes a daemon program called Cocoa supporting standard management protocols such as JMX, SNMP or others, and integrating security templates. This Cocoa program allows communication between the remote management server 2 and DTrace housed in the target server 1. A person skilled in the art will easily understand that other secure communication applications can be used to allow access from a remote server to a dynamic monitoring tool contained in a target server.

The management server comprises a Java application suitable for probing the target server 1. This Java application uses the JMX protocol in order to communicate with the target server 1. Access to the target server preferably requires input of a user name, a password, the IP address of the target server and a communication port.

When the management server is in charge of several target servers, it sends a script for each target server, then automatically and regularly, it polls each target server in order to return performance data fetched by each dynamic monitoring tool of each target server.

FIG. 2 shows an example script 4 which is sent in "consumer" form to the DTrace module of the target server. The term "consumer" is the term used for defining scripts in the module. In fact, in the management server, the scripts are edited and are sent as "consumer" scripts, optionally specified in a header of the message containing the script at the time of sending. The "consumer" is like an envelope in which is placed a script and associated elements such as in particular the lifetime, a specific parameter if a generic script is concerned, etc.

The script 4 can advantageously constitute a variable for a performance management application such as Infovista Server. This variable can be represented as in window 5 illustrated in FIG. 2.

Of course, the invention is not limited to the examples which have just been described, and numerous adjustments can be made to these examples without exceeding the scope of the invention.

```
dtrace:::BEGIN
{
    cpustart[cpu] = 0;
}
/* Flag this thread as idle */
sysinfo:unix:idle__enter:idlethread
{
    idle[cpu] = 1;
}
```

-continued

```
/* Save kernel time between running threads */
sched:::on-cpu
/cpustart[cpu]/
{
        this->elapsed = timestamp – cpustart[cpu];
        @Procs["KERNEL"] = sum(this->elapsed);
}
/* Save the elapsed time of a thread */
sched:::off-cpu,
sched:::remain-cpu,
profile:::profile-1sec
/cpustart[cpu]/
{
        /* determine the name for this thread */
        program[cpu] = pid == 0 ? idle[cpu] ? "IDLE" :
        "KERNEL" : execname;
}
        /* save elapsed */
        this->elapsed = timestamp – cpustart[cpu];
        @Procs[program[cpu]] = sum(this->elapsed);
        cpustart[cpu] = timestamp;
}
/* Record the start time of a thread */
sched:::on-cpu,
sched:::remain-cpu
{
        idle[cpu] = 0;
        cpustart[cpu] = timestamp;
}
```

The invention claimed is:

1. A method for measuring the performance of at least one target server housing a dynamic monitoring tool which can be controlled by scripts, the dynamic monitoring tool comprising predefined probes for acquiring the data relating to the behavior of an operating system and applications of said target server, the method comprising, from a remote management server, the following steps:

accessing a dynamic monitoring tool within the target server via a communication network;

remotely transmitting at least one script to be executed by the dynamic monitoring tool;

automatically accessing, at predetermined times, the target server to retrieve the performance data resulting from the execution of said script by the dynamic monitoring tool;

pre-integrating the dynamic monitoring tool with the operating system of the target server, and at the same time as said script being remotely transmitted, sending parameters relating to a lifetime of said script to be executed;

wherein the dynamic monitoring tool is a DTrace module, and the target server is accessed using a dedicated Java Measurement Extensions (JMX) protocol; and wherein a predetermined parameter is sent so that the dynamic monitoring tool executes the script continuously during a given lifetime defined by said predetermined parameter.

2. The method according to claim 1, further comprising using specific probes for allowing the acquisition of performance data relating to:

memory usage;
processor activity; and
disk activity.

3. The method according to claim 1, further comprising, at the remote transmission step, saving the script in the random access memory of the target server.

4. The method according to claim 1, further comprising saving the results generated by the dynamic monitoring tool in the random access memory of the target server.

5. The method according to claim 1, further comprising transmitting the script as a generic script together with a specific parameter.

* * * * *